United States Patent
Ertel et al.

(10) Patent No.: US 10,434,841 B2
(45) Date of Patent: Oct. 8, 2019

(54) SYSTEM AND METHOD OF DISTRIBUTING AIRFLOW IN A TRANSPORT REFRIGERATION UNIT

(71) Applicant: THERMO KING CORPORATION, Minneapolis, MN (US)

(72) Inventors: Christopher David Ertel, Minneapolis, MN (US); Abhijith Balakrishna, Karnataka (IN); Wilson Samuel Jesudason Lawrence, Karnataka (IN); Rajesh Ps, Karnataka (IN); Wayne Donnellan, Oranmore (IE); Kenneth Gleeson, Oranmore (IE); Gary Mullins, Claregalway (IE); John Gough, Kingston (IE)

(73) Assignee: Thermo King Corporation, Minneapolis, MN (US)

( * ) Notice: Subject to any disclaimer, the term of this patent is extended or adjusted under 35 U.S.C. 154(b) by 752 days.

(21) Appl. No.: 14/764,043

(22) PCT Filed: Jan. 28, 2014

(86) PCT No.: PCT/IB2014/000079
§ 371 (c)(1),
(2) Date: Jul. 28, 2015

(87) PCT Pub. No.: WO2014/115024
PCT Pub. Date: Jul. 31, 2014

(65) Prior Publication Data
US 2015/0360542 A1    Dec. 17, 2015

(30) Foreign Application Priority Data
Jan. 28, 2013   (IN) .............................. 221/DEL/2013

(51) Int. Cl.
*B60H 1/00* (2006.01)
*B60H 1/24* (2006.01)
(Continued)

(52) U.S. Cl.
CPC ......... *B60H 1/245* (2013.01); *B60H 1/00014* (2013.01); *B60P 3/20* (2013.01);
(Continued)

(58) Field of Classification Search
CPC ...... B60H 1/245; B60H 1/00014; B60H 1/32; B60H 1/00357; B60H 1/00364;
(Continued)

(56) References Cited

U.S. PATENT DOCUMENTS 3,792,595 A    2/1974   Willis
3,879,955 A    4/1975   Dostal et al.
(Continued)

FOREIGN PATENT DOCUMENTS

CA    2054763    8/1991
CA    2054736    1/1997
(Continued)

OTHER PUBLICATIONS

Zeeuw, Hans, DE29715576 translation.pdf, "Lightweight, low-cost, easily-cleaned and disinfected air ducting and distribution system", Sep. 1997, pp. 1-5.*
(Continued)

*Primary Examiner* — Vivek K Shirsat
*Assistant Examiner* — Ryan L Faulkner
(74) *Attorney, Agent, or Firm* — Hamre, Schumann, Mueller & Larson, P.C.

(57) ABSTRACT

Systems and methods to distribute airflow in an internal space of a transport unit are described. The airflow distribution system may include an airflow distributor forming an airflow passage with a roof of the transport unit. The airflow
(Continued)

distribution system may be also configured to allow airflow to discharge from a gap between the airflow distributor and the roof. The gap may be provided by at least one spacer between the airflow distributor and the roof. A back end of the airflow distribution system may be configured to provide a back pressure to the airflow passage while allowing the airflow to discharge. In operation, a front end of the airflow distribution system may be configured to receive airflow. The airflow can be distributed along the airflow passage and be discharged from the gap and the back end.

17 Claims, 11 Drawing Sheets

(51) Int. Cl.
*F25D 17/06* (2006.01)
*B60P 3/20* (2006.01)
*F25D 17/04* (2006.01)
*F25D 11/00* (2006.01)

(52) U.S. Cl.
CPC ............. *F25D 17/04* (2013.01); *F25D 17/06* (2013.01); *F25D 11/003* (2013.01); *F25D 2317/0665* (2013.01); *F25D 2317/0672* (2013.01); *F25D 2500/02* (2013.01)

(58) Field of Classification Search
CPC .............. B60H 1/00378; B60H 1/3232; B60H 2001/3239; B60H 2001/3241; B60H 2001/3248; B30P 3/20; F25D 17/04; F25D 17/06; F25D 11/003; F25D 2317/0665; F25D 2317/0672; F25D 2500/02
USPC ........................................................ 454/108
See application file for complete search history.

(56) References Cited

U.S. PATENT DOCUMENTS

| | | |
|---|---|---|
| 3,992,892 A | 11/1976 | Sain et al. |
| 4,399,737 A | 8/1983 | Severson |
| 4,799,607 A | 1/1989 | Podd |
| 4,887,437 A | 12/1989 | Fenton et al. |
| D310,501 S | 9/1990 | Brys |
| D319,420 S | 8/1991 | Brys |
| 5,040,693 A | 8/1991 | Podd, Sr. et al. |
| 5,152,735 A | 10/1992 | Podd, Jr. et al. |
| 5,167,472 A | 12/1992 | Podd, Sr. et al. |
| 5,181,625 A | 1/1993 | Podd, Sr. et al. |
| D383,105 S | 9/1997 | Brys |
| 5,809,798 A | 9/1998 | Clarke et al. |
| 6,116,044 A | 9/2000 | Gothier |
| D445,362 S | 7/2001 | Brys |
| 6,280,320 B1 | 8/2001 | Paschke et al. |
| D449,795 S | 10/2001 | Brys |
| 6,508,076 B1 | 1/2003 | Gast et al. |
| D632,225 S | 2/2011 | Brys |
| 2009/0320515 A1 | 12/2009 | Bischofberger et al. |
| 2012/0198866 A1 | 8/2012 | Zeidner |

FOREIGN PATENT DOCUMENTS

| | | |
|---|---|---|
| CA | 2664447 | 12/2009 |
| CN | 1182036 | 5/1998 |
| CN | 1502764 | 6/2004 |
| CN | 1502764 A * | 6/2004 |
| CN | 1502959 | 6/2004 |
| CN | 101713577 | 5/2010 |
| CN | 202038315 | 11/2011 |
| DE | 3817365 | 11/1989 |
| DE | 29715576 | 12/1997 |
| EP | 0282051 | 9/1988 |
| EP | 0832826 | 4/1998 |
| EP | 1122191 | 8/2001 |
| GB | 1445882 | 8/1976 |
| JP | 2000158930 | 6/2000 |
| JP | 2009243780 | 10/2009 |

OTHER PUBLICATIONS

Muller, Alex, DE3817365 translation.pdf, "Refridgerator trailer with specified material for cold air distribution channel in the load space", May 1988, pp. 1-7.*
Hu, Yunfeng, CN1502764 Translation.pdf, Portable pressure difference miniature freshness-retaining freezer, Jun. 2004, pp. 1-3.*
Extended European Search Report, dated Aug. 19, 2016, European Patent Application No. 14743819.6 (9 pages).
Chinese Office Action issued in corresponding Chinese Application No. 201480018552.3 dated Apr. 24, 2017. (6 pages).
International search report for International application No. PCT/IB2014/000079, dated Jun. 13, 2014 (4 pages).
Written opinion for International application No. PCT/IB2014/000079, dated Jun. 13, 2014 (6 pages).
"AAA Design Blue Ducts Air Ducts Systems for TK and Carrier," found online at http://www.blueducts.com/index.html, "Air Duct Systems for Temparature Controlled Trailers", AAA Design LLC, 110 East Broward Boulevard, Fort Lauderdale, FL 33301, May 28, 2013 (2 pages).
"Lamberet smart reefer on Solutrans," found online at http://iepieleaks.nl/lamberet-smart-reefer-solutrans/, IEPIELEAKS, Nov. 26, 2013 (7 pages).
European Office Action issued in European Application No. 14743819.6 dated Sep. 13, 2018 (9 pages).

* cited by examiner

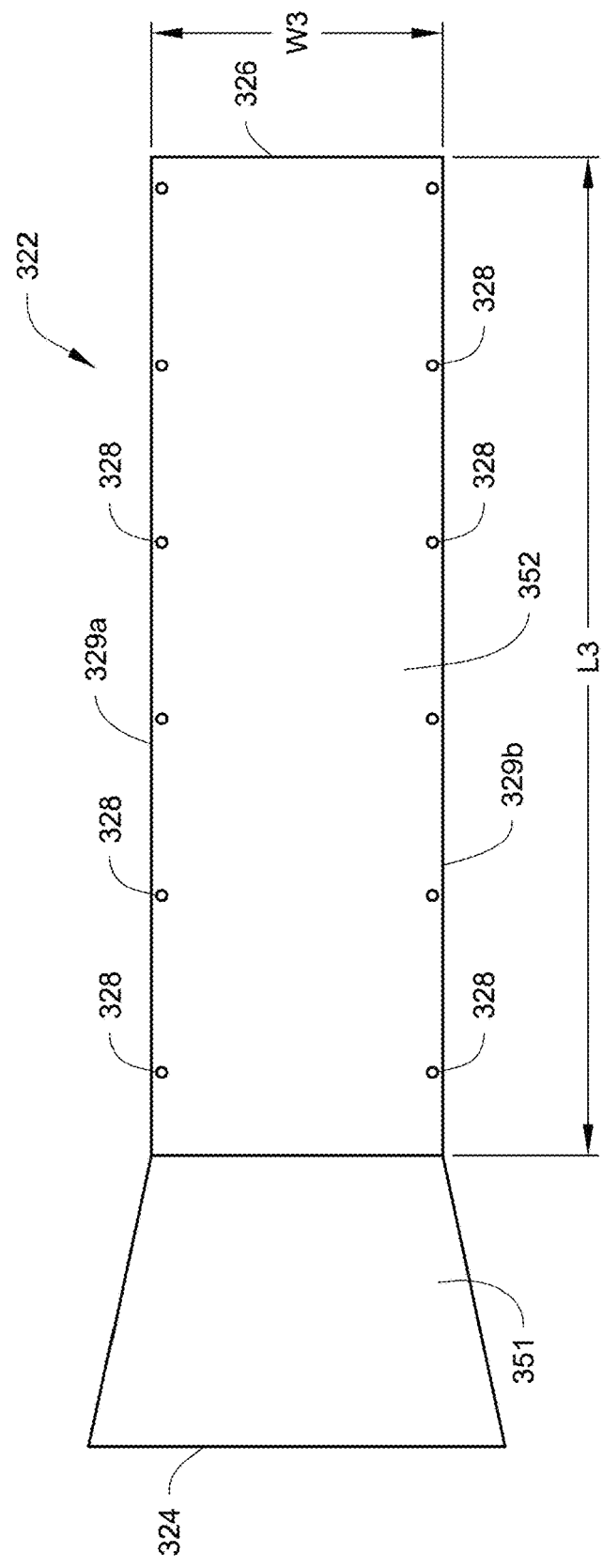

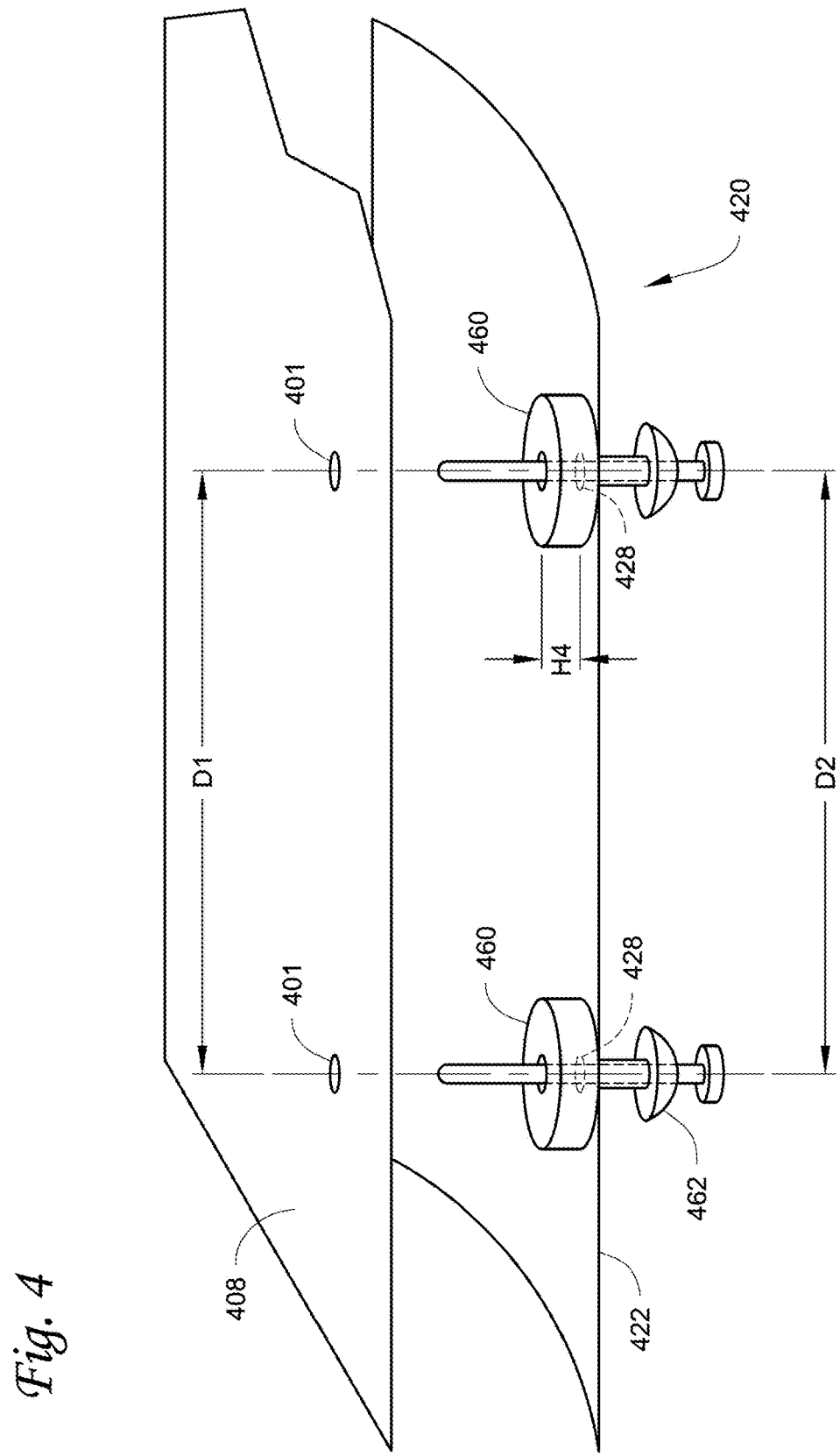

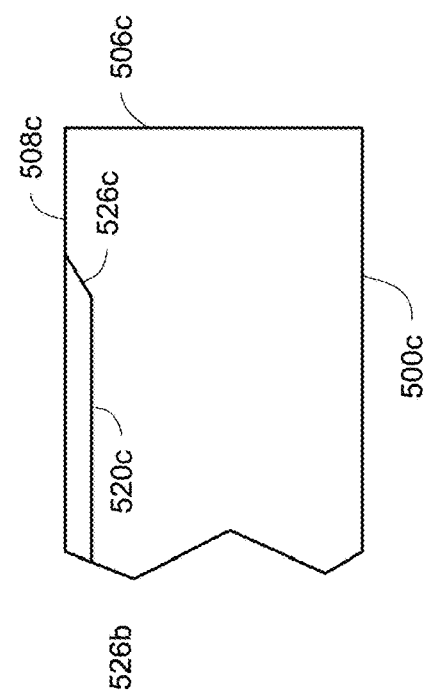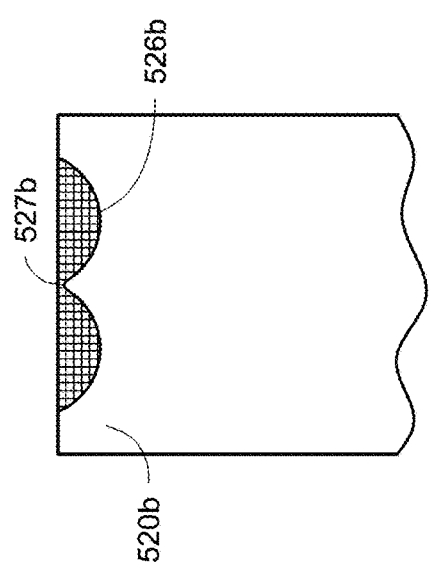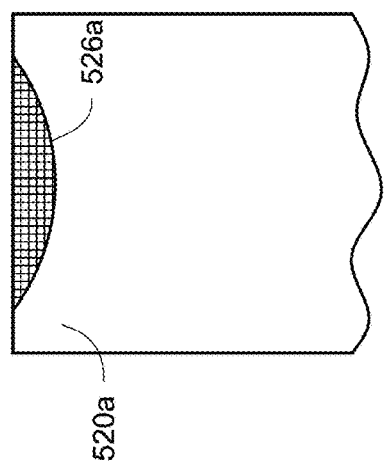

SYSTEM AND METHOD OF DISTRIBUTING AIRFLOW IN A TRANSPORT REFRIGERATION UNIT

FIELD

The disclosure herein relates to a temperature controlled transport unit. More particularly, the disclosure herein relates to systems and methods to distribute airflow conditioned (e.g. cooled or heated) by a transport refrigeration unit (TRU) inside a transport unit.

BACKGROUND

Existing TRUs are configured to work with transport units, such as containers, trailers, railway cars, trucks, airplanes, ships, and other transport units to control a temperature inside the transport units. Conventionally, the TRU is generally installed on one side of the transport unit where conditioned air is blown into an internal space of the transport unit.

SUMMARY

Methods and systems disclosed herein can help distribute airflow conditioned by a TRU inside a temperature controlled transport unit. Generally, the embodiments disclosed herein can help distribute the airflow to pass over a load surface(s) and also to the sides of the trailer, which can help improve temperature homogeneity on the load surface(s), i.e. any outside surfaces of the load when the load is positioned in the transport unit.

In some embodiments, an airflow distribution system may include an airflow distributor configured to form an airflow passage with a roof of the transport unit. In some embodiments, the airflow distributor may be configured to extend in a longitudinal direction toward a back wall of the transport unit. In some embodiments, a first end of the airflow distribution system may be configured to receive an airflow conditioned by a TRU, and then direct and distribute the airflow along the airflow passage.

In some embodiments, the airflow distribution system may be configured to allow airflow to discharge from a gap between longitudinal sides of the airflow distributor and the roof of the transport unit. In some embodiments, the airflow distribution system may be configured to allow the airflow to discharge from a back end of the airflow distribution system. In some embodiments, the amount of the airflow discharged from the gap between the airflow distributor and the roof of the transport unit and the amount of the airflow discharged by the back end can be at a desired ratio. In some embodiments, the amount of the airflow discharged from the gap and the amount of the airflow discharged from the back end may be about the same (i.e., in some embodiments the ratio of the amount of the airflow discharged from the gap and the ratio of the amount of the airflow discharged from the back end can be about 1:1).

In some embodiments, the gap can be provided by a spacer between the airflow distributor and the roof of the transport unit. In some embodiments, the second end of the airflow distribution system may be configured to provide a back pressure to the airflow passage, while allowing airflow to discharge. In some embodiments, the second end of the airflow distribution system may be configured to be covered by a mesh material.

In some embodiments, the first end of the airflow distribution system can be configured to be coupled to an airflow exit of the TRU. In some embodiments, the first end of the airflow distribution system may be configured to be coupled to the airflow exit through a mounting bracket. In some embodiments, the mounting bracket may be configured to at least partially surround the airflow exit. In some embodiments, the mounting bracket may have anchor points for a reference line, which may provide a reference for aligning the airflow distributor.

In some embodiments, an airflow distribution system can include an airflow distributor extending in a longitudinal direction of the transport unit. In some embodiments, the airflow distributor includes a first wing section, a second wing section, and a middle section in between the first and second wing sections. When the airflow distribution system is installed in the transport unit the middle section may be attached to a roof of the transport unit, and the first and second wing sections may be configured to curve downwardly from the middle section, forming a reversed "U" shaped airflow distribution system. In some embodiments, the first and second wing sections and the middle section may span across a width of the transport unit. The reversed "U" shaped airflow distribution system can help distribute the airflow toward the back end of the transport unit, as well as push the airflow downwardly to the sides of the transport unit.

In some embodiments, the airflow distributor may have a length in a longitudinal direction of the transport unit, and the length of the airflow distributor can be about ¼ of a length of the transport unit in the longitudinal direction. In some embodiments, when the airflow distribution system is installed in the transport unit, an area between the first and second wing sections and the roof may be sealed.

Other features and aspects will become apparent by consideration of the following detailed description and accompanying drawings.

BRIEF DESCRIPTION OF THE DRAWINGS

Reference is now made to the drawings in which like reference numbers represent corresponding parts throughout.

FIG. 3 illustrates a bottom view of an installed airflow distributor, according to one embodiment.

FIG. 4 illustrates a partial explosion view of a portion of an airflow distribution system according to one embodiment, including a spacer between an airflow distributor of the airflow distribution system and a roof of a transport unit.

FIGS. 5A to 5C illustrate different embodiments of an end of an airflow distribution system. FIGS. 5A and 5B are back views. FIG. 5C is a side view.

FIG. 6A is a back view of an transport unit. FIG. 6B is a perspective view of a mounting bracket.

FIG. 7A is a perspective view of a transport unit housing a load. FIG. 7B is a back view of the transport unit housing the load.

Figure 7A:
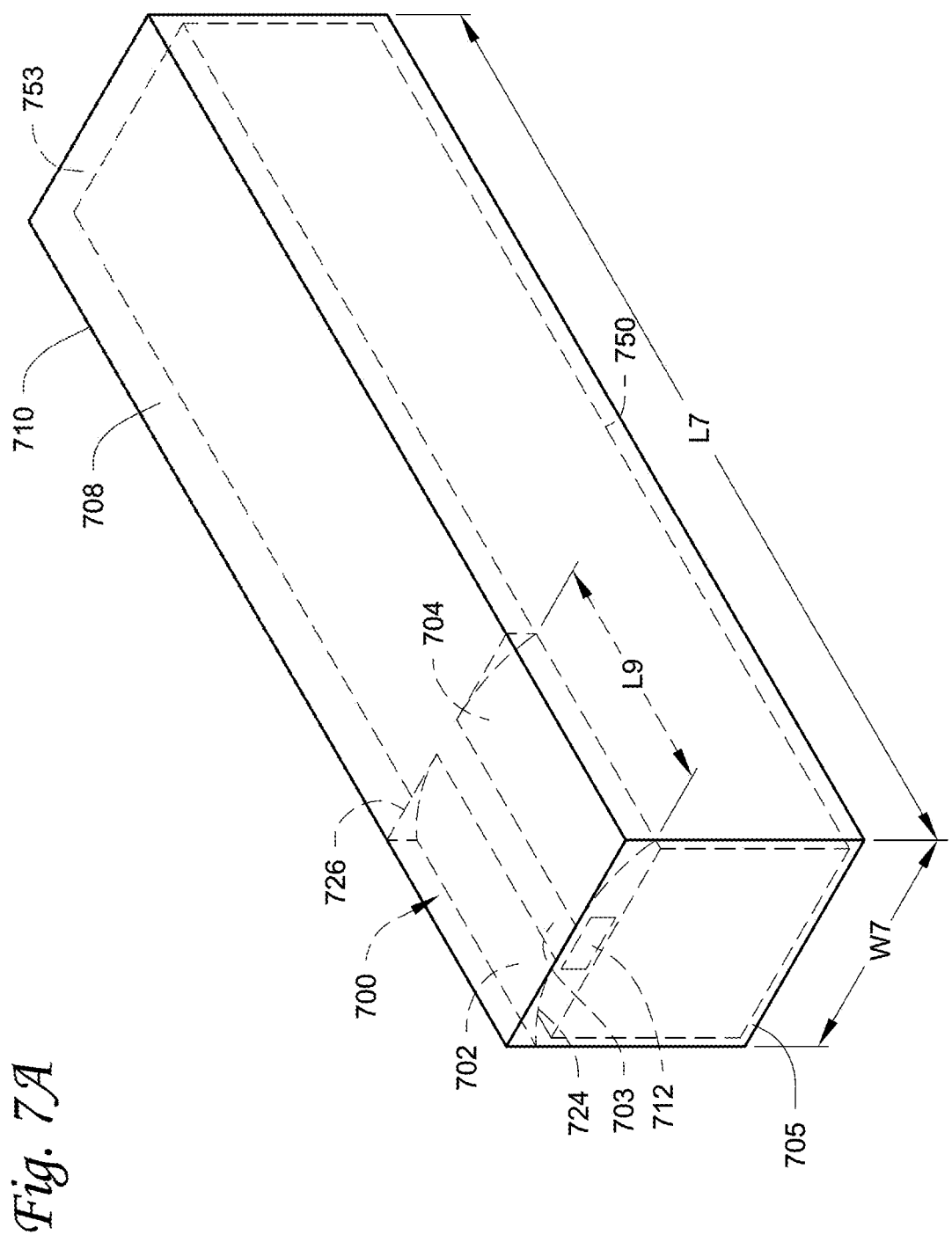
FIGS. 7A and 7B illustrate another embodiment of an airflow distribution system.
Figure 7B:
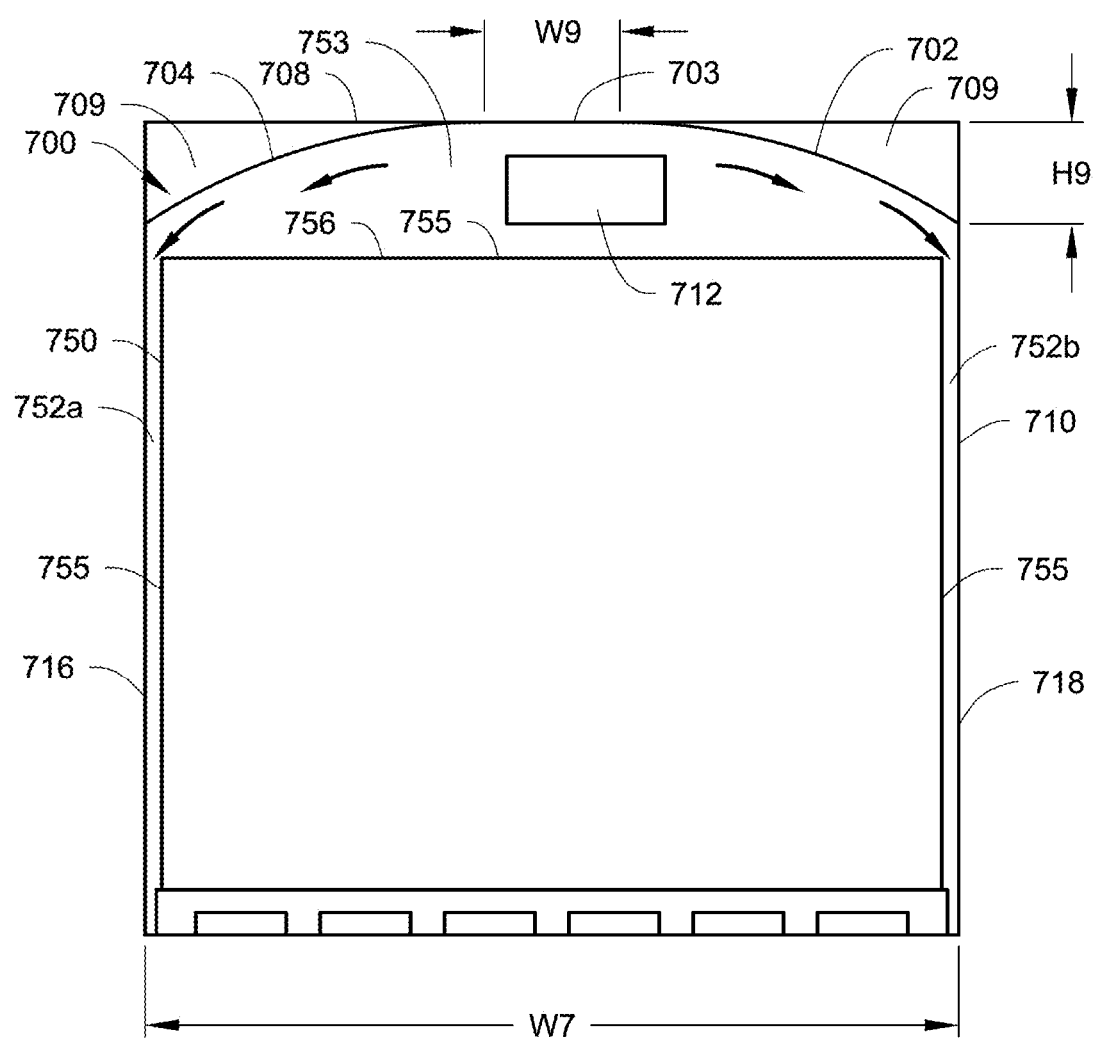

The airflow distribution system is configured similarly to the airflow distribution system as illustrated in FIGS. 7A and 7B.

Figure 1:
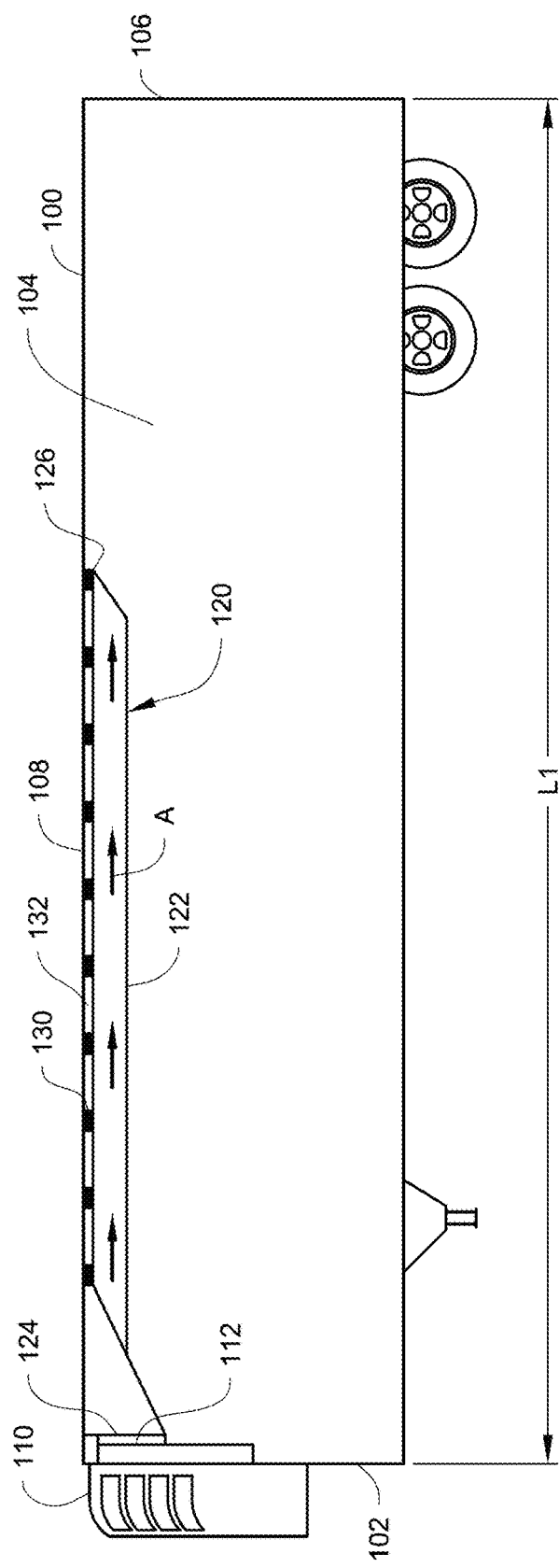
FIG. 1 illustrates a temperature controlled transport unit equipped with a TRU and an embodiment of an airflow distribution system.
Figure 2:
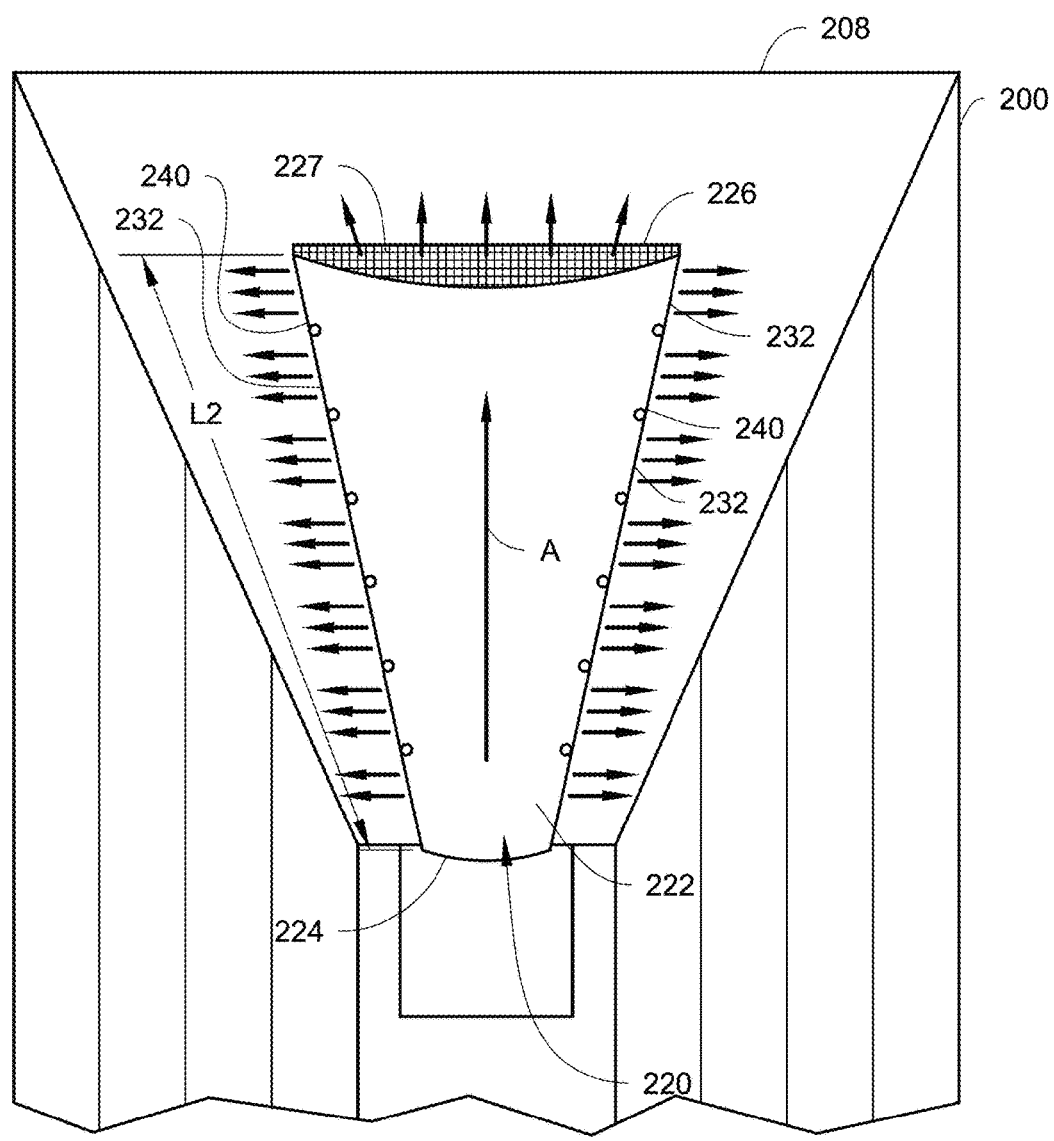
FIG. 2 illustrates a rear perspective view of an internal space of a transport unit with an airflow distributor system, according to one embodiment.
Figures 1, 9A:
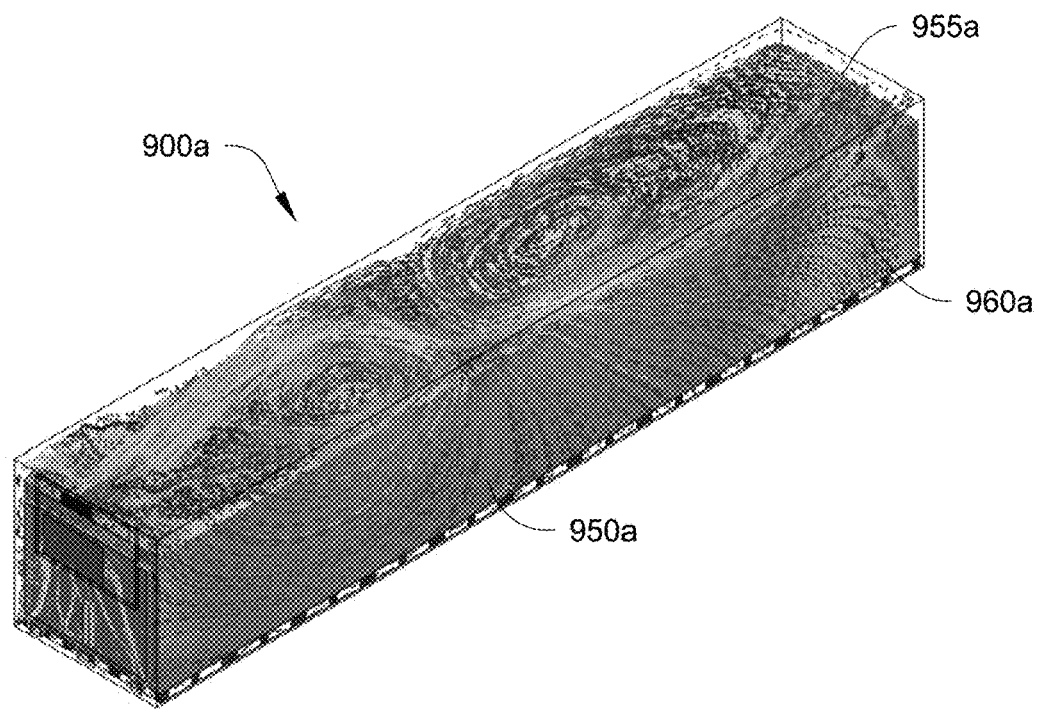
Figures 2, 9A:
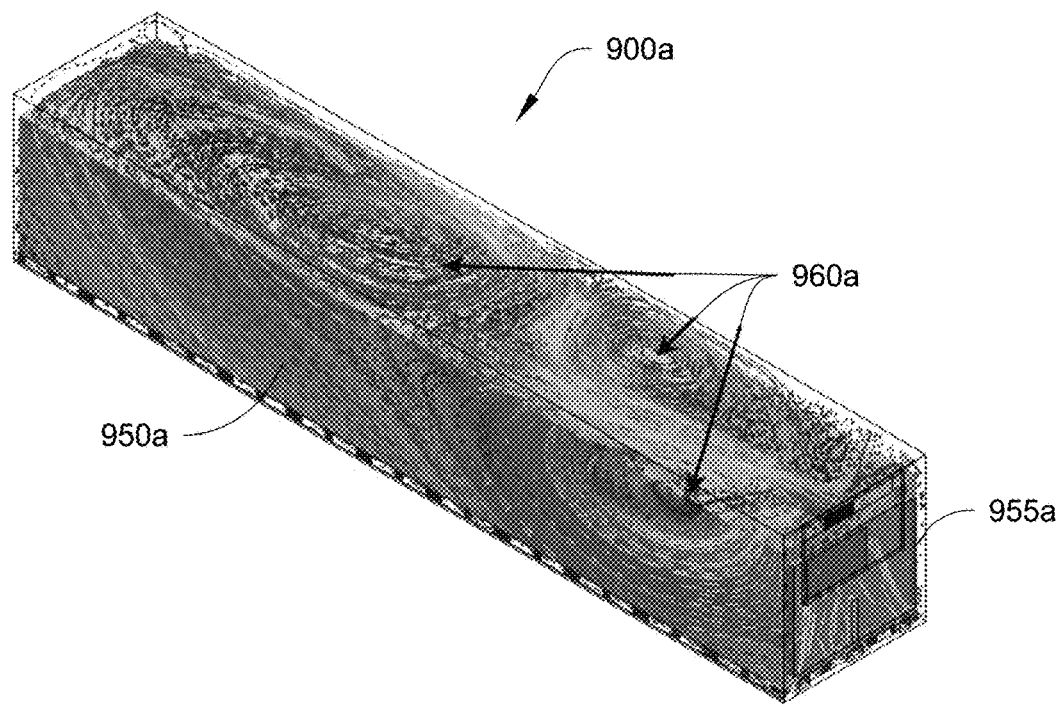
Figures 1, 9B:
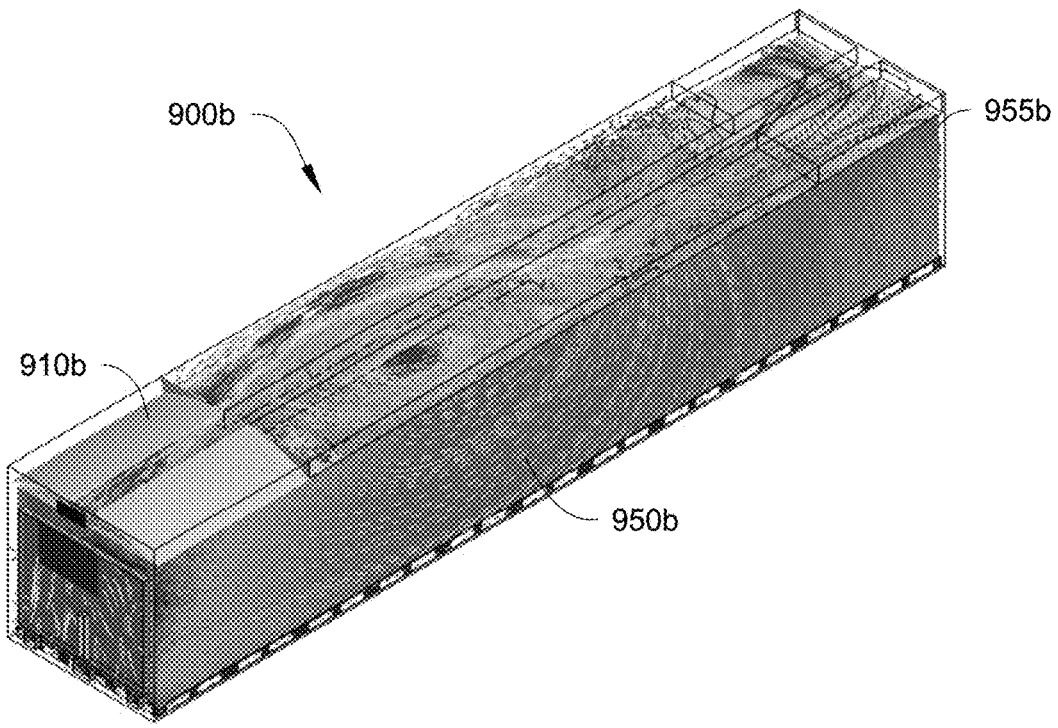
Figures 2, 9B:
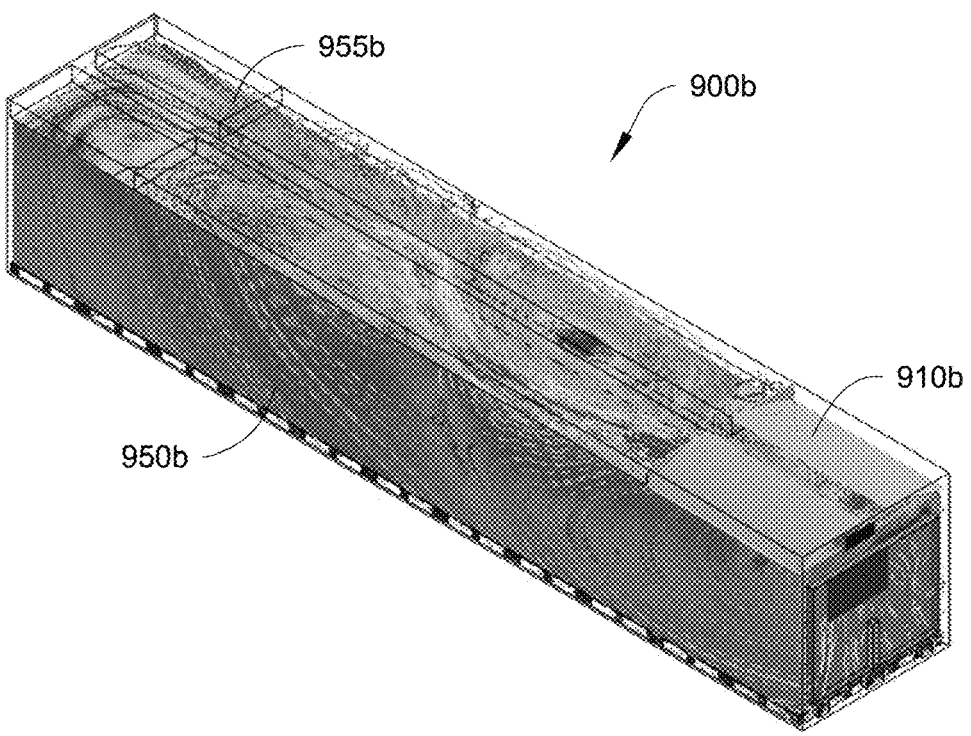

FIGS. 9A-1, 9A-2, 9B-1 and 9B-2 illustrate computer simulation analysis results of airflow speeds and temperature distributions in a transport unit. FIG. 9A-1 illustrates a left-side perspective view and FIG. 9A-2 illustrates a right-side perspective view of the computer simulation analysis results in a transport unit without an airflow distribution system. FIG. 9B-1 illustrates a left-side perspective view and FIG. 9B-2 illustrates a right-side perspective view of the computer simulation analysis results in a transport unit with an airflow distribution system.

DETAILED DESCRIPTION

A TRU can be installed on a transport unit, such as a container, a trailer, a railway car, a truck, an airplane, a ship, and other transport units. The TRU can be configured to regulate a space temperature of the transport unit, which can help regulate a temperature on a load (e.g., food) in the transport unit. Generally, airflow can be circulated through a heat exchanger (e.g., an evaporator coil) of the TRU to exchange heat with the heat exchanger so as to condition (for example, the temperature of) the airflow. The airflow can then be directed back to the space of the transport unit to regulate the space temperature. The TRU generally is installed on one side of the transport unit. The embodiments provided herein can help distribute the airflow exiting the TRU more evenly in the space of the transport unit to, for example, avoid uneven temperature distribution in the space, and/or save energy. The embodiments provided herein can also help reduce hot spots on load surface(s) and help improve the temperature homogeneity on the load surface(s).

Embodiments of an airflow distribution system and methods of use are disclosed herein. Generally, the embodiments as disclosed herein can help distribute airflow exiting a TRU to pass over load surface(s) and also to the sides of the transport unit. In some embodiments, the airflow distribution system may have an airflow distributor that is configured to be a sheet-like material extending along a roof of the transport unit. In some embodiments, the air flow distribution system can have a "U" shape. In other embodiments, the airflow distributor can form a reversed "U" shaped airflow passage with the roof of the transport unit.

The airflow passage can be configured to direct and distribute airflow along the airflow passage. In some embodiments, the airflow distributor can be spaced away from the roof of the transport unit so that the airflow can be discharged through a gap between the airflow distributor and the roof of the transport unit. In some embodiments, a second end of the airflow distribution system may be configured to be covered by a mesh material. The mesh material can allow the airflow to discharge through the mesh material, but at the same time may provide some back pressure to the airflow passage.

The airflow distribution system as disclosed herein may help distribute airflow evenly and uniformly in the space of the transport unit and help achieve uniform space temperature in the transport unit. The airflow distribution may also help increase fuel efficiency of the TRU. Because the second end of the airflow distribution system can be covered by the mesh material in some embodiments, the airflow distribution system may also help avoid the second end of the airflow distribution system to be caught by goods and/or loading machineries during the loading process.

References are made to the accompanying drawings that form a part hereof, and in which is shown by way of illustration of the embodiments in which the embodiments may be practiced. The term "couple" is generally referred to as "connect to" and/or "physically attach to." It is to be understood that the terms used herein are for the purpose of describing the figures and embodiments and should not be regarding as limiting the scope of the present application.

FIG. 1 illustrates one embodiment of a transport unit 100 equipped with a TRU 110 and an airflow distribution system 120, according to one embodiment. The airflow distribution system 120 can help distribute airflow to pass over a load surface(s) and to the sides of the transport unit 100. In the embodiment illustrated, the transport unit 100 is a truck trailer, with the appreciation that the transport unit can be other suitable apparatuses, such as containers, railway cars, trucks, airplanes, ships, and other transport units. The airflow distribution system 120 can generally allow air to be discharged from a plurality of gaps 132 along a side of the airflow distribution system 120 and a back end 126.

The TRU 110 is installed on a front wall 102 of the transport unit 100. An airflow exit 112 of the TRU 110 is configured to open to an internal space 104 of the transport unit 100. The TRU 110 includes a heat exchanger and a blower (not shown), which are configured to help exchange heat with airflow in the internal space 104 by directing the airflow through the heat exchanger. The airflow, after exchanging heat with the heat exchanger, can be directed out of the airflow exit 112.

The airflow distribution system 120 includes an airflow distributor 122, which extends in a longitudinal direction defined by a length L1 of the transport unit 100. A front end 124 of the airflow distributor 122 is configured to cover the airflow exit 112 of the TRU 110 so that the front end 124 can receive airflow from the airflow exit 112.

The back end 126 of the airflow distributor 122 extends toward an end wall 106 of the transport unit 100 along the longitudinal direction defined by the length L1. In the illustrated embodiment, the back end 126 does not extend to the full length L1 of the transport unit 100; with the notion that the back end 126 can be configured to extend to the full length L1 of the transport unit 100. In some embodiments, the back end 126 is within about 5 feet from the end wall 106 of the transport unit 100. It is to be appreciated that the location of the back end 126 in the longitudinal direction can be varied and can be optimized, for example, by using a computer simulation analysis. That is, the back end of the airflow distributor 122 can vary based on, for example, user requirements, the length L1 of the transport unit 100, results of optimization analysis, etc.

The airflow distributor 122 is spaced away from a roof 108 of the transport unit 100 using a plurality of spacers 130. The spacers 130 can help form the plurality of gaps 132 between the airflow distributor 122 and the roof 108 in the longitudinal direction, which allows the airflow to discharge from the gaps 132 into the internal space 104. The airflow distributor 122 can be installed to the roof 108 of the transport unit 100 by using, for example, a plurality of drive rivets through the spacers 130. (See FIG. 4 for more details.)

The airflow distributor 122 and the roof 108 can form an airflow passage A (illustrated in FIG. 1 by arrows) along the longitudinal direction defined by the length L1. In operation, the airflow passage A can be configured to direct and distribute airflow exiting the airflow exit 112 to flow from the front end 124 toward the back end 126 of the airflow distributor 122. The back end 126 of the airflow distributor 122 may generally be configured to allow the airflow to discharge from the back end 126. The plurality of gaps 132 can allow the airflow to discharge from the gaps 132 when the airflow flowing along the airflow passage A. Discharging the airflow from the gaps 132 and the back end 126 can help distribute the airflow evenly in the space 104 of the transport unit 100.

FIG. 2 illustrates a rear perspective view of an internal space of a transport unit 200 with an airflow distribution system 220. The airflow distribution system is configured similarly to the airflow distribution system as shown in FIG. 1. Referring to FIG. 2, the airflow distribution system 220 is configured to have an airflow distributor 222 that forms an airflow passage A (which is indicated in FIG. 2 by the long arrow) with a roof 208, a front end 224 configured to receive an airflow from a TRU (such as the TRU 110 in FIG. 1), a back end 226 configured to allow the airflow to discharge from the airflow passage A and/or to provide a back pressure to the airflow passage A, and a plurality of gaps 232 along longitudinal sides 240 of the airflow distributor 222 configured to allow the airflow to discharge from the airflow passage A. The longitudinal sides 240 of the airflow distributor 222 are the sides that follow a longitudinal direction that is defined by a length L2 of the airflow distributor 222. The term "back pressure" is referred to a pressure created by, for example, the back end 226 when the airflow discharges through the back end 226.

The short arrows in FIG. 2 generally indicate the airflow directions when the airflow is discharged from the airflow passage of the airflow distribution system 220. The airflow distribution system 220 is configured to receive the airflow from the front end 224 (via e.g., the TRU 110 in FIG. 1), then direct the airflow in the airflow passage A toward a back end 226 along the longitudinal direction that is defined by the length L2 of the airflow distributor 222. The airflow can be discharged from the gaps 232 and the back end 226 of the airflow distribution system 220.

The material of the airflow distributor 222 can be made of plastic, vinyl, woven materials, or other suitable materials. In some embodiments, the airflow distributor 222 can be a sheet-like material made of a soft material such as a fabric, or a hard material such as a sheet metal. The airflow distributor 222 can form a "U" shaped airflow passage. When a soft material is used, the "U" shape can be formed due to the draping of the soft material by gravity.

The back end 226 is generally configured to provide the back pressure while allowing the airflow to discharge from the airflow passage A. For example, in the illustrated embodiment, the back end 226 of the airflow distribution system 220 is configured to be covered by a mesh material 227. The mesh material 227 can allow the airflow to discharge from gaps of the mesh; while at the same time the mesh material 227 can also provide the back pressure in the airflow passage A at the same time. The back pressure provided by the mesh material 227 can be regulated for example by controlling the mesh density, and/or the amount of mesh or mesh area. Generally, the higher the mesh density is, the higher the back pressure. Generally, the higher the back pressure is, more air can be discharged out of the gaps 232. It is noted that the back end 226 does not have to be covered by the mesh material in some embodiments. The back pressure can be provided, for example, by shaping the back end 226 (such as reducing the size of the back end by riveting to close off a portion of the back end 226). (See the description below for FIGS. 5A to 5C for more examples.)

The airflow distribution of the airflow distribution system 220 may be set by a length of the airflow distribution 222, a size of the gaps 232, and/or the mesh density of the back end 226 (or more generally the back pressure provided by the back end 226), with the appreciation that other factors may also affect the airflow distribution, such as, for example, a cross section area of the air distribution system 220. In general, the airflow discharged from the gaps 232 is directed toward sides of the transport unit 200 that is generally perpendicular relative to the longitudinal direction defined by the length L2; and the airflow discharged from the back end 226 is directed toward an end wall of the transport unit 200 (e.g., the end wall 106 of the transport unit 100 in FIG. 1, now shown in FIG. 2) of the transport unit 200 that is in the longitudinal direction defined by the length L2.

In operation, the amount of the airflow discharged from the gaps 232 and the amount of the airflow discharged from the back end 226 can be set at a desired ratio or in accordance with a desired distribution. For example, the amount of the airflow discharged from the gaps 232 and the amount of the airflow discharged from the back end 226 can be roughly the same (for example the ratio can be about 1:1). It is to be appreciated that the ratio can be varied or optimized. Generally, increase the size of the gaps 232 (such as an increase in the height H4 as shown in FIG. 4) can increase the amount of airflow discharged from the gaps 232, thus increasing the airflow distributed to the sides of the transport unit 200. An increase in the back pressure provided by the back end 226 (e.g. increasing the mesh density of the mesh material 227) can also increase the amount of airflow discharged from the gaps 232. Conversely, decreasing the back pressure provided by the back end 226 (e.g. decreasing the mesh density of the mesh material) can increase the amount of airflow discharged from the back end 226, thus increasing the amount of the airflow distributed toward the end wall of the transport unit 200. Therefore, by configuring the size of the gaps 232 and/or the back pressure provided by the back end 226 (which affects the amount of airflow allowed by the back end 226), a desired ratio between the amount of the airflow discharged by the gaps 232 and the back end 226 can be set. In practice, a desired ratio can be determined for example in a laboratory setting or by a computer simulation analysis.

It is to be appreciated that the embodiment as shown in FIG. 2 is one specific example of an airflow distributor system that is configured to distribute airflow in a longitudinal direction of the transport unit as well as toward the sides of the transport unit in the space of the transport unit. The general structure of the airflow distributor system may include an airflow distributor that is configured to receive airflow exiting a TRU and direct the airflow toward an end of the transport unit. The longitudinal sides of the airflow distributor can be spaced away from a roof of the transport unit so that the airflow can be distributed toward the sides of the transport unit through the gaps between the longitudinal sides of the airflow distributor and the roof of the transport unit. In some embodiments, a back end of the airflow distribution system can have a structure (e.g. a mesh) to provide a back pressure to the airflow distribution system while allowing airflow to flow through therein.

FIG. 3 illustrates a bottom view of an airflow distributor 322 of an airflow distribution system configured similarly to the airflow distribution system 120 as illustrated in FIG. 1. The airflow distributor 322 includes a front end 324 that can be configured to be coupled to a TRU (e.g. The TRU 110 in FIG. 1) and receive airflow conditioned by the TRU, and a back end 326.

The airflow distributor 322 also includes a plurality of mounting points 328 distributed along longitudinal sides 329a and 329b of the airflow distributor 322. The mounting points 328 can be holes in the airflow distributor 322, through which an anchor can be installed. The mounting points 328 can be used to mount the airflow distributor 322 to a roof of a transport unit (e.g. the roof 108 in FIG. 1). The airflow distributor 322 can be configured to be made of a sheet-like soft material such as a fabric, or a sheet-like hard material such as a sheet metal. The material can be vinyl, plastic, woven fabrics, nylon, or other suitable materials.

Shapes of the airflow distributor 322 can vary. In the embodiment as illustrated in FIG. 3, the shape of the airflow distributor 322 generally includes a tapered first section 351 and a generally rectangular second section 352 with a length L3 and a width W3. The tapered first section 351 is generally configured to receive the airflow released by the TRU and direct the airflow toward the second section 352. The second section 352 is generally configured to direct and distribute the airflow along a longitudinal direction defined by the length L3 of the second section 352. In some embodiments, the length L3 is about 35 to 48 feet and the width W3 is about 35 to 65 inches. In some embodiments, the tapered first section 351 may be configured to have a tapering of 5 to 20 degrees.

The width W3 refers to the width of the second section 352 of the airflow distributor 322. Since the airflow distributor 322 may be configured to be made of soft materials that can drape from a roof of the transport unit (see, for example, FIG. 2) to form a "U" shape, a width of the material used to make the airflow distributor 322 may be different from (e.g. larger than) the width W3 of the airflow distributor 322.

It is to be noted that the second section 352 can be configured to have other shapes. For example, the second section 352 can be configured to have a tapered shape along the longitudinal direction defined by the length L3 toward the back end 352 (i.e. the width W3 decreases in the longitudinal direction defined by the length L3 toward the back end 326) to, for example, increase a back pressure from the back end 326 compared to a non-tapered shape. Or the second section 326 can be configured to have a tapered shape along the longitudinal direction defined by the length L3 toward the front end 324 (i.e. the width W3 increases along the longitudinal direction defined by the length L3 toward the front end 324) to, for example, decrease a back pressure from the back end 326 compared to a non-tapered shape.

FIG. 3 illustrates that the first section 351 has a tapered profile. This is exemplary. It is to be appreciated that the first section 351 can be configured to have a non-tapered shape. In some embodiments, the second section 352 can be coupled to the TRU directly without using the first section 351. In some embodiments, the second section 352 can be configured to receive at least a portion of airflow exiting the TRU without physically coupled to the TRU. In some embodiments, a width of the front end 324 can be the same as the width W3 of the back end 326.

Referring to FIG. 4, an embodiment of an airflow distribution system 420 showing an explosion view of a portion of an airflow distributor 422 mounted to a roof 408 of a transport unit is illustrated. The airflow distributor 422 is configured to have a plurality of mounting points 428, which is a through hole in the illustrated embodiment. The roof 408 is configured to have installation holes 401 matching the mounting points 428. Generally, a distance D1 between the installation holes 401 is about the same as a distance D2 between the mounting points 428. In some embodiments, with the notion the distances D1 and D2 can be different.

During installation, a spacer 460 with a height H4 is positioned between the mounting points 428 and the matching holes 401. The spacer 460 is configured to maintain a gap (e.g. the gaps 132 in FIG. 1) between the roof 408 and the airflow distributor 422. The gaps allow airflow to discharge from an airflow passage (the airflow passage A in FIG. 1). By changing the height H4 of the spacer 460, the size of the gap can be changed, which may result in changing the amount of airflow discharged from each gap. Generally, the higher the height H4 of the spacer 460 is, the higher the amount of airflow discharged from each gap.

The spacer 460 can have various configurations. In FIG. 4, the space 460 has a cylinder shape. It is to be appreciated that the shape of the spacer 460 can vary. Generally, the spacer 460 is configured to maintain a gap between the airflow distributor 422 and the roof 408.

A traditional airflow distributor is often mounted to the roof of the transport unit directly by using, for example, mounting holes on the airflow distributor. When the airflow distributor is made of, for example, a flexible fabric, the fabric can drape between two mounting holes. However, the amount of draping between two mounting holes cannot be easily controlled, causing inconsistencies in installing the airflow distributors to different transport units. By using the spacer 460 to maintain the gaps between the airflow distributor 422 and the roof 408, the fabric between two neighboring spacers 460 can be straightened to minimize draping. Therefore, the configuration of the airflow distributor 422 can be better controlled, which can help improve installation consistency.

The airflow distributor 422 is mounted to the roof 408 by inserting a mounting assembly 462 through the mounting point 428, the spacer 460 and the holes 401. The mounting assembly 462 can be, for example, an express nail. The mounting assembly 462 can be configured to expand once installed into the installation hole to hold the mounting assembly 462 in place relative to the roof 408. In some embodiments, the mounting assembly 462 may include one or more Velcro tapes or other suitable apparatuses.

The height H4 may vary for the spacers 460 positioned at different mounting points 428 of the airflow distributor 420. However, using the same height H4 for all the spacers 460 can save time and prevent errors during an installation process of the airflow distributor 422. Generally, the distances D1 and D2 are configured to be roughly the same. As a result, the airflow distributor 422 generally does not drape between the two neighboring mounting points 428, even when a soft material is used for the airflow distributor 422. Draping of the material can cause material flopping in operation, which can be detrimental to airflow distribution. Therefore, using the spacers 460 can help reduce the material flopping in operation. Using spacers 460 may also help reduce variations of the gaps between the airflow distributor 422 and the roof 408, so that a desired configuration for the airflow distribution system 420 can be maintained and repeated during installation.

FIGS. 5A to 5C illustrate different embodiments of a back end 526a, 526b and 526c of an airflow distributor 520a, 520b and 520c respectively. FIGS. 5A and 5B are back views, and FIG. 5C is a side view. As illustrated in FIGS. 5A and 5B, the back ends 526a and 526b can be configured to be covered by a mesh material. A mesh density of the mesh material can be varied to, for example, meet different requirements. For example, the mesh density can be selected so that the back ends 526a, 526b and 526c can provide a desired back pressure in operation.

FIG. 5A illustrates that the back end 526a can be configured to conform to a natural drape shape of an airflow distributor 520a. FIG. 5B illustrated that the back end 526b can be configured to have a lifted middle point 527b, which may be attached to a roof of a transport unit. The lifted middle point 527b may help prevent the back end 526b from being caught by goods or loading machineries during a transport unit loading/unloading process.

As illustrated in FIGS. 5A and 5B, the back end 526a and 526b can be configured to be a mesh material, which can provide a back pressure while allow airflow to discharge through therein.

FIG. 5C illustrates that the back end 526c can be configured to be oblique. In the illustrated embodiment, the back end 526c is configured to be inclined from a roof 508c and project away from an end wall 506c of a transport unit 500c. The inclined back end 526c may help avoid the back end 526c from being caught by goods or loading machineries during a transport unit loading/unloading process.

It is to be noted that the configurations as illustrated in FIGS. 5A to 5C are merely exemplary. The back end can be configured to have other shapes or configurations.

Figure 6A:
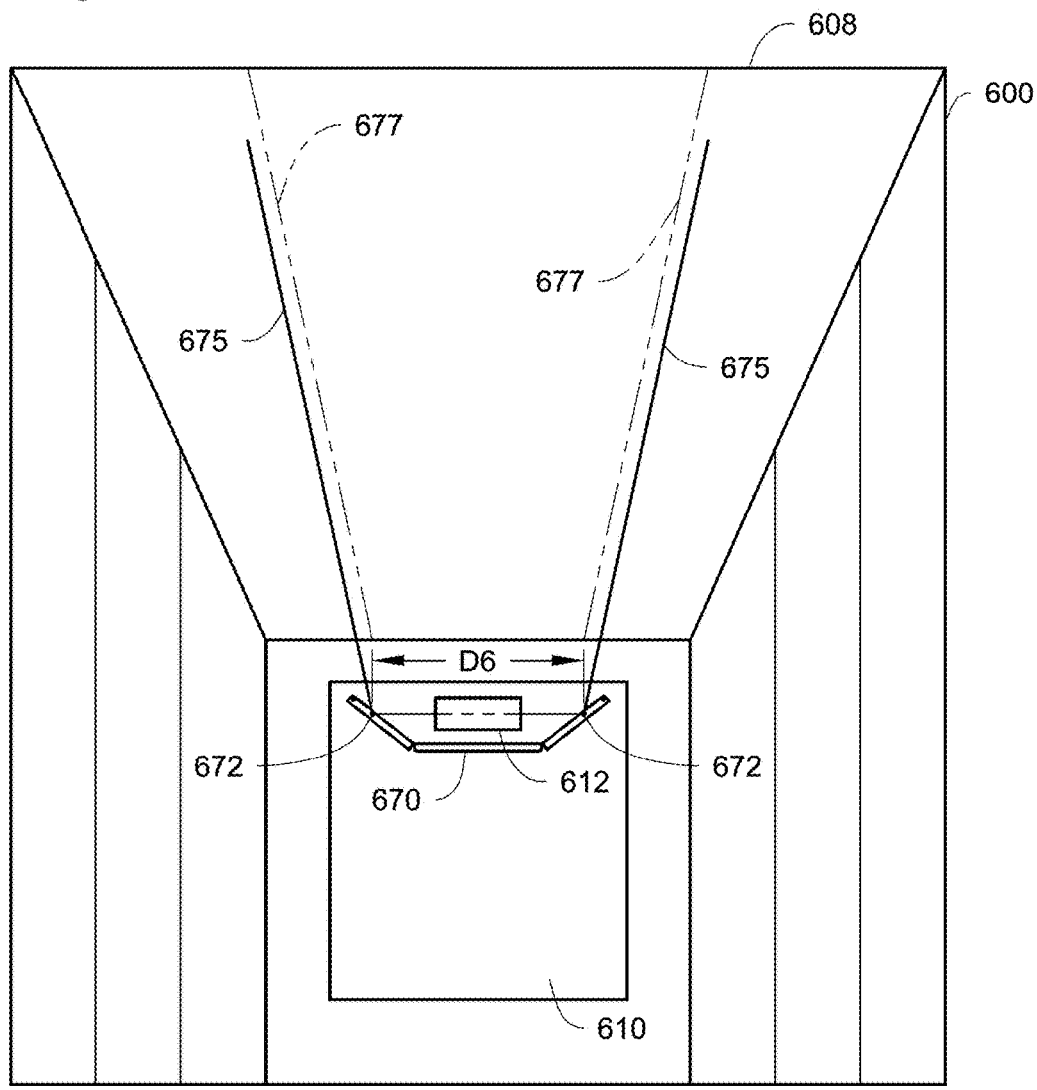
FIGS. 6A and 6B illustrate an embodiment of a mounting bracket that is configured to couple an airflow distributor of an airflow distribution system to an airflow exit of a TRU.
Figure 6B:
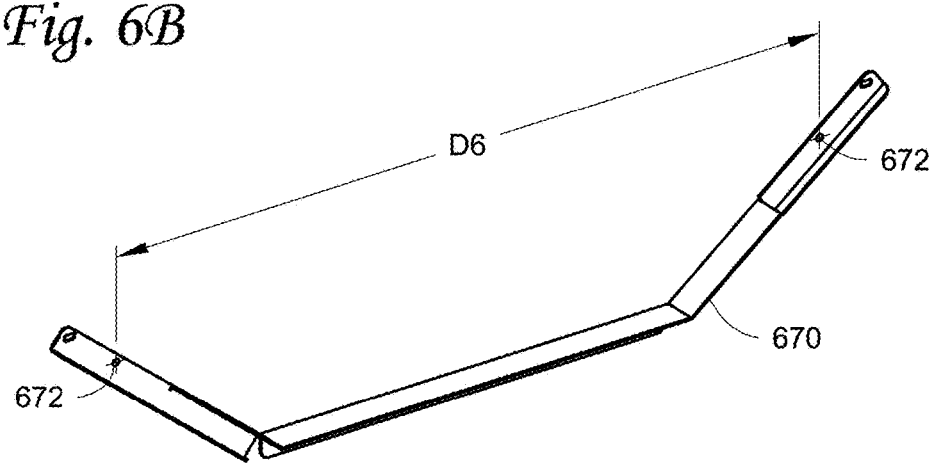

Referring to FIGS. 6A and 6B, a front end, such as the front end 124 in FIG. 1, of the airflow distributor 122 can be coupled to an airflow exit 612 of a TRU 610 through a mounting bracket 670. FIG. 6A illustrates a back view of a transport unit 600 equipped with the TRU 610. FIG. 6B illustrates a perspective view of the mounting bracket 670. The mounting bracket 670 generally can be attached to the TRU 610 from inside of a transport unit 600. The mounting bracket 670 has a profile that can be configured to at least partially surround the airflow exit 612. The front end of the airflow distribution system (such as the front end 124 in FIG. 1) can be attached to the mounting bracket 670 following the profile of the mounting bracket 670. The front end of the airflow distribution system can be attached to the mounting bracket 670, for example, by one or more Velcro tapes, drive rivets, or other suitable apparatuses. Since the profile of the mounting bracket 670 is configured to partially surround the airflow exit 612, the front end of the airflow distributor can be braced around the airflow exit 612 and receive airflow exiting the airflow exit 612 after being attached to the mounting bracket 670.

The mounting bracket 670 can be configured to have anchor points 672 configured to receive reference lines 675. The reference lines 675 can provide references for installing an airflow distribution system. Referring to FIGS. 6A, 6B and 3, a distance D6 can be configured, for example, to be about the same as the width W3 of the second section 352 as illustrated in FIG. 3. In some embodiments, the reference lines 675 can be a chalk marker line, which can be used to mark a roof 608 with guiding markers 677.

When a soft material is used to make the airflow distribution system, the material may drape. The distance D6 may be smaller than the width of the material used to make the airflow distribution system because of the draping. The distance D6 and the width of the material used can be varied to achieve a desired draping.

During installation, the mounting bracket 670 can be firstly mounted to the TRU 610. Then reference lines 675 can be anchored to the anchor points 672 of the mounting bracket. The reference lines 675 can be extended from the anchor points 672 to an end wall of the transport unit 600. The reference lines 675 can provide guiding markers 677 for installing the airflow distributor. For example, a chalk line marker can be used as the reference lines 675 to mark the roof 608 of the transport unit 600 with guideline markers 677 for the longitudinal sides 329a and 329b of the second section 352 of the airflow distributor 322. This may help align the airflow distributor 322 during the installation of the airflow distributor 322.

The embodiments as disclosed herein can help even airflow distribution inside the transport unit and facilitate the installation of the airflow distribution system. As disclosed, the airflow distribution system can be configured to discharge airflow from the sides and the end of the airflow distribution system. The ratio of the airflow discharged from the sides and from the end can be determined, for example, in a laboratory setting or by a computer simulation analysis. The height of the spacers (such as H4 in FIG. 4) and the characteristics of the back end (such as mesh density of a mesh material) can be set to achieve a preferred air distribution pattern, such as a preferred ratio between the airflow distributed from the gaps and the airflow distributed by the back end. The spacers and the mesh material can then be used for a production airflow distribution system. During installation, the airflow distribution system can be coupled to an airflow exit of a TRU easily with the mounting bracket. The mounting bracket can also be configured to have pre-positioned anchor points for attaching a reference line. The reference line can provide an alignment guidance for installing the airflow distribution system. For example, a chalk line marker can be used to mark a roof of a transport unit with a reference lines to be aligned with longitudinal sides of the airflow distributor of the airflow distribution system. The airflow distributor can therefore be easily mounted to the roof of the transport unit. The reference line can also help reproduce the desired airflow distribution determined for example in the laboratory in an operational transport unit installed with the airflow distribution system.

FIGS. 7A and 7B illustrate another embodiment of an airflow distribution system 700 that can help distribute airflow to pass over a surface(s) 755 of a load 750 and toward sides of the load 750 in a transport unit 710.

Referring to FIG. 7A, the airflow distribution system 700 extends in a longitudinal direction that is defined by a length L7 of the transport unit 710, and has a front end 724 and a back end 726. The front end 724 is positioned higher than an airflow exit 712 in the orientation shown and can be positioned immediately adjacent to a front wall 705 of the transport unit. The airflow distribution system 700 can direct the airflow exiting the airflow exit 712 toward the back end 726 of the airflow distribution system 700.

Referring to FIGS. 7A and 7B, the airflow distribution system 700 can include a first wing 702, a second wing 704 and a middle section 703. The middle section 703 is generally a non-curved flat section. The middle section 703 can be attached to a roof 708 of the transport unit 710. The middle section 703 has a width W9. In some embodiments, the width W9 can be about 40 cm.

The first and second wings 702, 704 curve downwardly from the middle section 703 toward side walls 716, 718 of the transport unit 710, forming a reversed "U" shape. When the transport unit 710 is housing the load 750, the reversed "U" shaped airflow distribution system 700 is configured to be higher than a top 756 of the load 750. In some embodiments, the reversed "U" shaped airflow distribution system 700 can have a height H9 of about 25 cm.

As illustrated in the embodiments, when installed, the first and second wings 702, 704 and the middle section 703 can span across an entire width W7 of the transport unit 710 between the two side walls 716, 718. In some embodiment, the width W7 is about 250 cm.

Referring to FIG. 7A, the airflow distribution system 700 extends in the longitudinal direction of the transport unit 710 defined by the length L7 and has a length L9. In some embodiments, the length L9 can be about ¼ of the length L7. In some embodiments, the length L9 can be about 250 cm. It is appreciated that the length L9 can be varied based on user requirements, the size of the transport unit 710, results of an optimization analysis via, for example, a computer simulation analysis.

Referring to FIG. 7B, an area 709 between the first and second wings 702, 704 and the roof 708 of the transport unit 710 can be sealed so that airflow is prevented from passing over the area 709. Referring to FIGS. 7A and 7B, when the load 750 is positioned in the transport unit 710, the first and second wings 702, 704 of the air distribution system 700 are configured to overlap with at least a portion of the load 750 in the longitudinal direction.

Referring to FIGS. 7A and 7B, typically when the load 750 is situated in the transport unit 710, the outer surfaces 755 of the load are configured to be spaced away from the side walls 716, 718 and the roof 708. As illustrated, the outer surfaces 755 of the load 750 can form spaces 752*a*, 752*b* with the side walls 716, 718 respectively, and form a space 753 with the roof 708. In operation, airflow can be distributed to the spaces 752*a*, 752*b* and 753 so as to regulate, for example, a temperature of the outer surfaces 755.

The airflow distribution system 700 can be made of various materials, including for example, flexible fabric, hard plastic, metal, cardboard, or other suitable materials.

Figure 8:
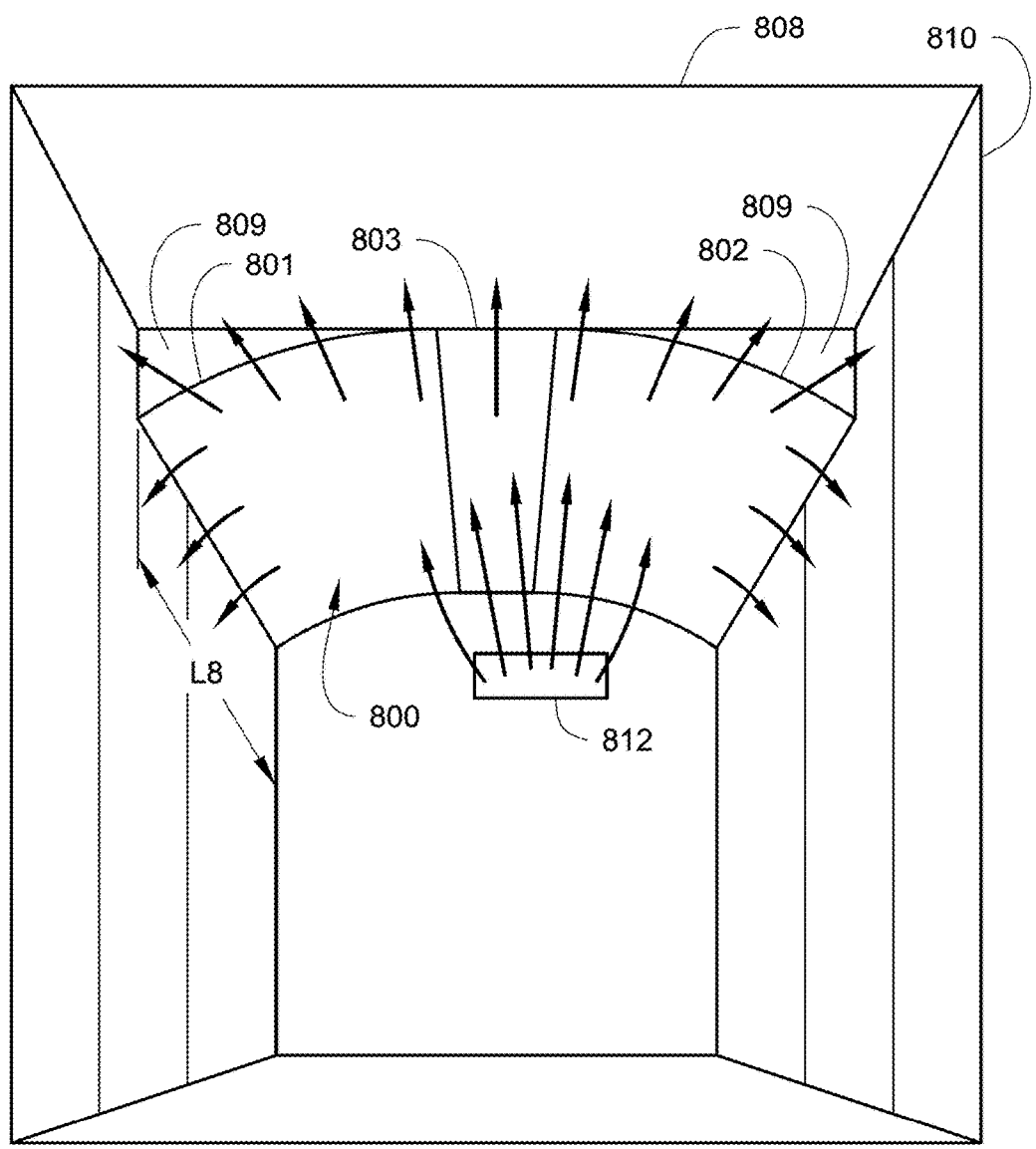
FIG. 8 illustrates a rear perspective view of an internal space of a transport unit with an airflow distribution system.

Referring to FIG. 8, an end perspective view of a transport unit 810 with a reversed "U" shaped airflow distribution system 800 similar to the embodiments as shown in FIGS. 7A and 7B is illustrated. The airflow distribution system 800 includes a relatively non-curved flat middle section 803 and first and second downwardly curved wing sections 801, 802.

In operation, airflow exiting an airflow exit 812 can be directed by the airflow distribution system 800. The airflow distribution system 800 can direct the airflow in a longitudinal direction that is defined by a length L8 of the airflow distribution system 800 toward an end of the transport unit 810. The downwardly curved wing sections 801, 802 of the airflow distribution system 800 can also push the airflow downwardly.

An area 809 between the wing sections 801, 802 and a roof 808 are sealed so that airflow is prevent from entering the area 809. The area 809 provides some insulation between the roof 808 and the wing sections 801, 802, which can help reduce the effect of ambient temperature.

Referring back to FIGS. 7A and 7B, when the transport unit 710 houses the load 750, the airflow distribution system 700 can direct airflow toward an end of the transport unit 710 in the space 753 between the load 750 and the airflow distribution system 700. The downwardly curved wing sections 702, 704 can also push the airflow downwardly, directing the airflow into the spaces 752*a* and 752*b* between the side walls 716, 718 and the load 750. As a result, the airflow can be more evenly distributed compared to a transport unit without an airflow distribution system.

Experimental Data

A computer simulation analysis was performed to compare a load surface airflow speeds and temperature distributions in a transport unit without an airflow distribution system to a transport unit with an airflow distribution system configured similarly to the embodiment as disclosed in FIGS. 7A and 7B.

FIGS. 9A-1, 9A-2, 9B-1 and 9B-2 illustrate the computer simulation analysis results analyzing airflow speeds and temperature distributions on load surfaces 955*a*, 955*b* in transport units 900*a*, 900*b* respectively, which house loads 950*a*, 950*b* respectively. Dashed lines and gray shades represent the airflow speeds and the temperature distribution on load surfaces 955*a*, 955*b*. As illustrated in FIGS. 9A-1 and 9A-2, in the transport unit 900*a* that does not have an airflow distribution system, a plurality of hot spots 960*a* (defined in these computer simulations as a region with a temperature that is higher than, for example, about 4° C.) can be detected on the load surfaces 955*a*. As illustrated in FIGS. 9B-1 and 9B-2, in the transport unit 900*b* that is equipped with an airflow distribution system 910*b*, the load surfaces 955*b* generally do not have any hot spots.

The computer simulation analysis results also indicated that over 90% of the load surfaces 955*b* in the transport unit 900*b* with the airflow distribution system 910*b* were within the desired temperature band of about 0-4° C., compared to about 80% in the transport unit 900*a* without the airflow distribution system.

The computer simulation analysis results support that the airflow distribution system can help to evenly distribute airflow inside a transport unit.

Aspects

Any of aspects 1-8 can be combined with any of aspects 9-18. Any of aspects 9-11 can be combined with any of aspects 12-18. Any of aspects 12-15 can be combined with any of aspects 16-18. Any of aspects 16, 17 can be combined with aspect 18.

Aspect 1. An airflow distribution system for a transport unit, comprising:
an airflow distributor configured to form an airflow passage with a roof of a transport unit, the airflow distributor extending in a longitudinal direction of the transport unit; and
a plurality of spacing devices;
wherein longitudinal sides of the airflow distributor is spaced away from the roof of the transport unit by the plurality of spacing devices.

Aspect 2. The airflow distribution system of aspect 1, wherein an end of the airflow distributor is covered by a mesh material.

Aspect 3. The airflow distribution system of aspects 1-2, wherein an end of the airflow distributor is configured to incline from a roof of the transport unit in a direction that is away from a back end of the transport unit, when the airflow distribution system is installed to the transport unit.

Aspect 4. The airflow distribution system of aspects 1-3, further comprising a mounting bracket;
wherein the mounting bracket is configured to couple an end of the airflow distribution system to an airflow exit of a transport refrigeration unit.

Aspect 5. The airflow distribution system of aspect 4, wherein the mounting bracket includes at least one reference line attaching point.

Aspect 6. The airflow distribution system of aspects 1-5, wherein the plurality of spacing devices are a plurality of spacers.

Aspect 7. The airflow distribution system of aspects 2-6, wherein the mesh material is configured to provide a desired back pressure to the airflow passage in operation.

Aspect 8. The airflow distribution system of aspects 2-7, wherein the mesh material is configured so that an amount of airflow discharged from gaps along the longitudinal sides of the airflow distributor and an amount of airflow discharged from the mesh material is about the same.

Aspect 9. An airflow distribution system for a transport unit, comprising:

an airflow distributor extending in a longitudinal direction of the transport unit, the airflow distributor including a first wing section, a second wing section, and a middle section in between the first and second wing sections;

when the airflow distribution system is installed in the transport unit the middle section is configured to be attached to a roof of the transport unit, the first and second wing sections are configured to curve downwardly from the middle section; and the first and second wing sections and the middle section span across a width of the transport unit.

Aspect 10. The airflow distribution system of aspect 9, wherein the airflow distributor has a length in a longitudinal direction of the transport unit, and the length of the airflow distributor is ¼ of a length of the transport unit in the longitudinal direction.

Aspect 11. The airflow distribution system of aspects 9-10, wherein when the airflow distribution system is installed in the transport unit, an area between the first and second wing sections and the roof are sealed.

Aspect 13. An airflow distribution system for a transport unit, comprising:

an airflow distributor configured to form an airflow passage with a roof of a transport unit, the airflow distributor extending in a longitudinal direction of the transport unit; and a mesh material;

wherein an end of the airflow distributor is defined by the mesh material.

Aspect 14. The airflow distribution system of aspect 13, wherein the mesh material has a lifted center portion.

Aspect 15. The airflow distribution system of aspects 13-14, wherein the mesh material is configured to incline from a roof of the transport unit in a direction that is away from a back end of the transport unit, when the airflow distribution system is installed to the transport unit.

Aspect 16. A transport unit, comprising:

a roof;

an air distribution system including a first wing section, a second wing section and a middle section between the first and second wing sections, the first wing section, the second wing sections and the middle section extending in a longitudinal direction of the transport unit;

wherein the middle section is attached to the roof of the transport unit, the first wing section and the second wing section span across a width of the transport unit and form a reversed "U" shape from the roof of the transport unit.

Aspect 17. The transport unit of aspect 16, wherein the transport unit has a first length and the air distribution system has a second length in the longitudinal direction of the transport unit, and the second length is about ¼ of the first length.

Aspect 18. A method of distributing airflow in a transport unit, comprising:

receiving airflow from a first end of the transport unit;

directing the airflow in an airflow passage formed by an airflow distributor and a roof of the transport unit along a longitudinal direction of the transport unit toward a second end of the transport unit;

discharging airflow from a gap along a side of the airflow passage;

discharging airflow from an end of the airflow passage; and providing a back pressure to the airflow passage at the end of the airflow passage, so that an amount of airflow discharged from the gap and an amount of airflow discharged from the back end is at a desired ratio.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What is claimed is:

1. An airflow distribution system for a transport unit, comprising:

an airflow distributor configured to form an airflow passage with a roof of the transport unit, the airflow distributor extending in a longitudinal direction of the transport unit, and the airflow distributor having a front end and a back end that are opposite ends of the airflow distributor in the longitudinal direction, wherein the airflow distributor defines a first opening at the front end that allows air to enter the airflow passage and a second opening at the back end that allows air to exit the airflow passage;

a mesh material covering the second opening at the back end of the airflow distributor; and a plurality of spacing devices, wherein when the airflow distribution system is installed to the transport unit, air flows in the longitudinal direction through the mesh material from the airflow passage, and longitudinal sides of the airflow distributor are spaced away from the roof of the transport unit by the plurality of spacing devices.

2. The airflow distribution system of claim 1, wherein the mesh material is configured to incline from the roof of the transport unit in a direction that is away from a back end of the transport unit, when the airflow distribution system is installed to the transport unit.

3. The airflow distribution system of claim 1, further comprising a mounting bracket;

wherein the mounting bracket is configured to couple an end of the airflow distribution system to an airflow exit of a transport refrigeration unit.

4. The airflow distribution system of claim 3, wherein the mounting bracket includes at least one anchor point for attaching a reference line.

5. The airflow distribution system of claim 1, wherein the plurality of spacing devices are a plurality of spacers that are positioned between the roof of the transport unit and the airflow distributor.

6. The airflow distribution system of claim 1, wherein the mesh material is configured to provide a desired back pressure to the airflow passage in operation.

7. The airflow distribution system of claim 1, wherein the mesh material is configured so that a ratio of an amount of airflow discharged from gaps along the longitudinal sides of the airflow distributor and an amount of the airflow discharged from the mesh material is about 1:1.

8. The airflow distribution system of claim 1, wherein an airflow permeability of the mesh material is greater than an airflow permeability of a material of the airflow distributor.

9. The airflow distribution system of claim 1, wherein gaps are formed along each longitudinal side of airflow distributor, each of the gaps defined by one of the longitudinal sides of the airflow distributor, the roof of the transport unit, and two of the plurality of spacing devices.

10. An airflow distribution system for an internal space of a transport unit, the transport unit configured to transport a load in the internal space, the airflow distributor comprising:
an airflow distributor extending in a longitudinal direction of the transport unit, the airflow distributor including a first wing section, a second wing section, and a middle section in between the first and second wing sections, wherein
when the airflow distribution system is installed in the transport unit, the middle section is configured to be attached to a roof of the transport unit, the first and second wing sections are configured to curve downwardly from the middle section, and
the first and second wing sections and the middle section span across a width of the transport unit forming a reversed "U" shape.

11. The airflow distribution system of claim 10, wherein the airflow distributor has a length in the longitudinal direction of the transport unit, and the length of the airflow distributor is ¼ of a length of the transport unit in the longitudinal direction.

12. The airflow distribution system of claim 10, wherein when the airflow distribution system is installed in the transport unit, an area between the first and second wing sections and the roof are sealed.

13. An airflow distribution system for a transport unit, comprising:
an airflow distributor configured to form an airflow passage with a roof of the transport unit, the airflow distributor extending in a longitudinal direction of the transport unit, and the airflow distributor having a front end and a back end that are opposite ends of the airflow distributor in the longitudinal direction, wherein the airflow distributor defines a first opening at the front end that allows air to enter the airflow passage and a second opening at the back end that allows air to exit the airflow passage; and
a mesh material covering the second opening at the back end of the airflow distributor, wherein an airflow permeability of the mesh material is greater than an airflow permeability of a material of the airflow distributor, and
wherein when the airflow distribution system is installed in the transport unit, air flows in the longitudinal direction through the mesh material from the airflow passage.

14. The airflow distribution system of claim 13, wherein the mesh material has a lifted middle portion.

15. The airflow distribution system of claim 13, wherein the mesh material is configured to incline from the roof of the transport unit in a direction that is away from a back end of the transport unit, when the airflow distribution system is installed to the transport unit.

16. A method of distributing airflow in a transport unit, comprising:
receiving airflow from a first end of the transport unit;
directing the airflow in an airflow passage formed by an airflow distributor and a roof of the transport unit along a longitudinal direction of the transport unit toward a second end of the transport unit;
discharging airflow from a gap along a side of the airflow passage;
discharging airflow from an end of the airflow passage in the longitudinal direction through a mesh material; and
providing a back pressure to the airflow passage at the end of the airflow passage, so that an amount of airflow discharged from the gap and an amount of airflow discharged from the back end is at a desired ratio.

17. The airflow distribution system of claim 16, wherein an airflow permeability of the mesh material is greater than an airflow permeability of a material of the airflow distributor.

* * * * *